Jan. 25, 1966     H. FINNSTRAND     3,230,947

COOKING UNIT

Filed March 29, 1963     3 Sheets-Sheet 1

INVENTOR.
HARALD FINNSTRAND
BY Charles A. Black
ATTORNEY

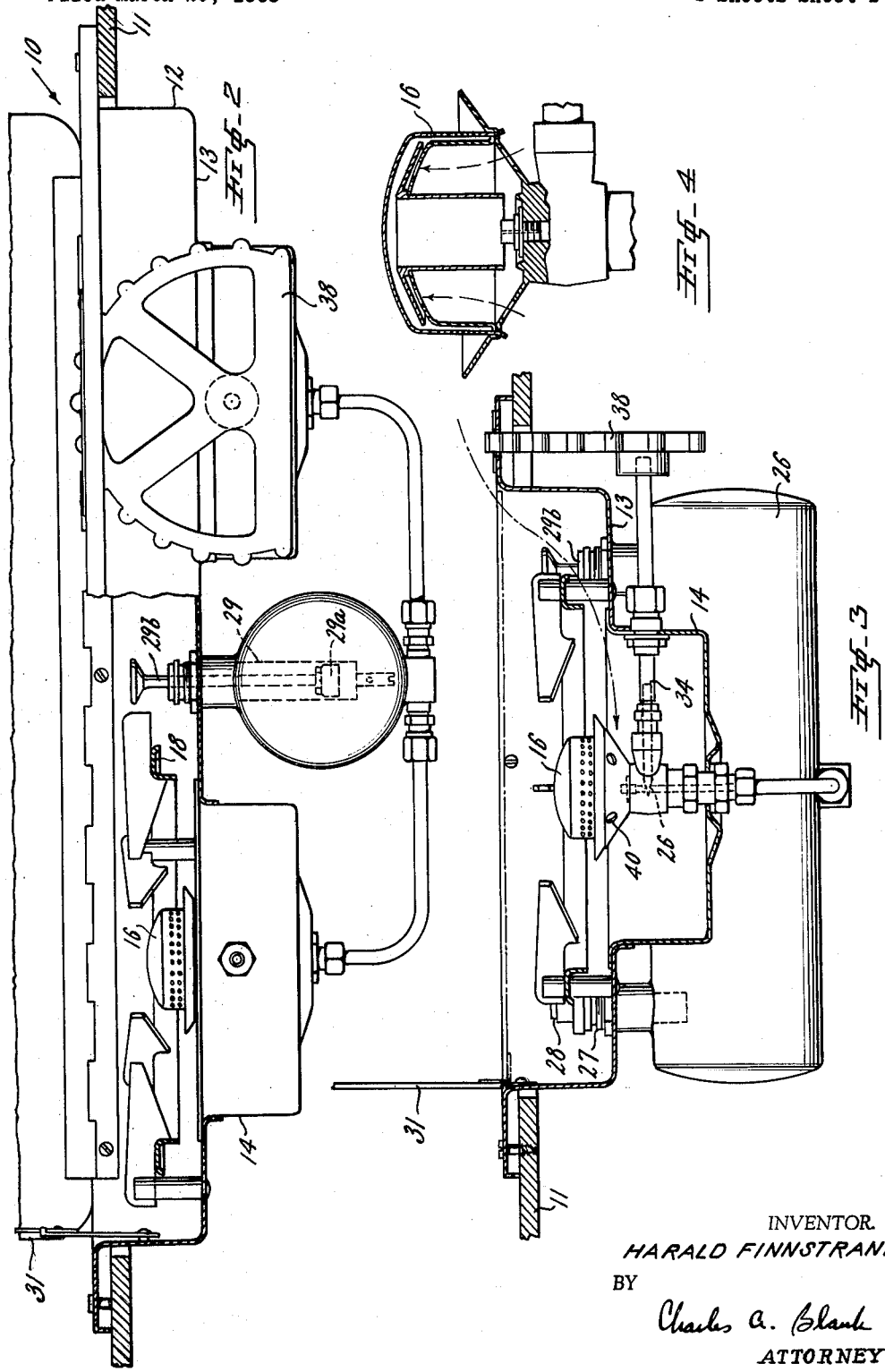

INVENTOR.
HARALD FINNSTRAND
BY
Charles A. Blank
ATTORNEY

United States Patent Office 3,230,947
Patented Jan. 25, 1966

3,230,947
COOKING UNIT
Harald Finnstrand, Pelham, N.Y., assignor to Homestrand Incorporated, Larchmont, N.Y., a corporation of New York
Filed Mar. 29, 1963, Ser. No. 268,968
5 Claims. (Cl. 126—24)

This invention relates to cooking units and, more particularly, to surface cooking units suitable, for example, for use in marine galleys.

Heretofore, cooking units for marine galleys have generally been units which are adapted for mounting above a galley counter. The body of such a unit is exposed and guard rails are utilized to prevent utensils from sliding off the unit. A liquid fuel tank containing, for example, alcohol may be utilized. A pump for the fuel tank has its handle projecting through the front surface of the unit and control knobs for the burners are mounted on shafts projecting through the front surface. Accordingly, such a unit is not adapted for mounting as a surface cooking unit preferably having its top surface substantially flush with top surface of the counter.

It is an object of the present invention, therefore, to provide a new and improved cooking unit which avoids one or more of the above-mentioned limitations of prior such units.

It is another object of the invention to provide for a marine galley a new and improved surface cooking unit which does not require guard rails.

It is another object of the invention to provide for a marine galley a new and improved surface cooking unit adapted to have a top closure surface substantially flush with a galley counter top.

It is another object of the invention to provide for a marine galley a liquid-tight surface cooking unit utilizing a liquid fuel.

It is another object of the invention to provide for a marine galley a surface cooking unit in which all controls are accessible from a position above the unit.

As will be more fully explained hereinafter, while providing a liquid-tight unit, I have made provison for adequate combustion air to reach the burners of the unit.

In accordance with the invention, a surface cooking unit comprises a body shell having a lower wall including at least one recessed burner-supporting portion integral with the lower wall. The unit includes a fuel burner mounted on the recessed portion within the shell. The recessed portion with the burner mounted thereon forms a liquid-tight well in the lower wall. A utensil support is mounted above the lower wall within the shell for supporting a utensil above the burner. The utensil support has a lower surface spaced from the lower wall of the body shell to allow combustion air to reach the burner between the utensil support and the body shell.

For a better understanding of the present invention, together with other and further objects thereof, reference is made to the following description taken in connection with the accompanying drawings, and its scope will be pointed out in the appended claims.

Referring now to the drawings:

FIG. 2 is a front elevational view, with parts broken away, of the FIG. 1 unit;

FIG. 3 is a sectional view of the FIG. 1 unit, taken along line 3—3 of FIG. 1;

FIG. 4 is an enlarged view, partly in section, of a burner utilized in the FIG. 1 unit;

Figure 1:
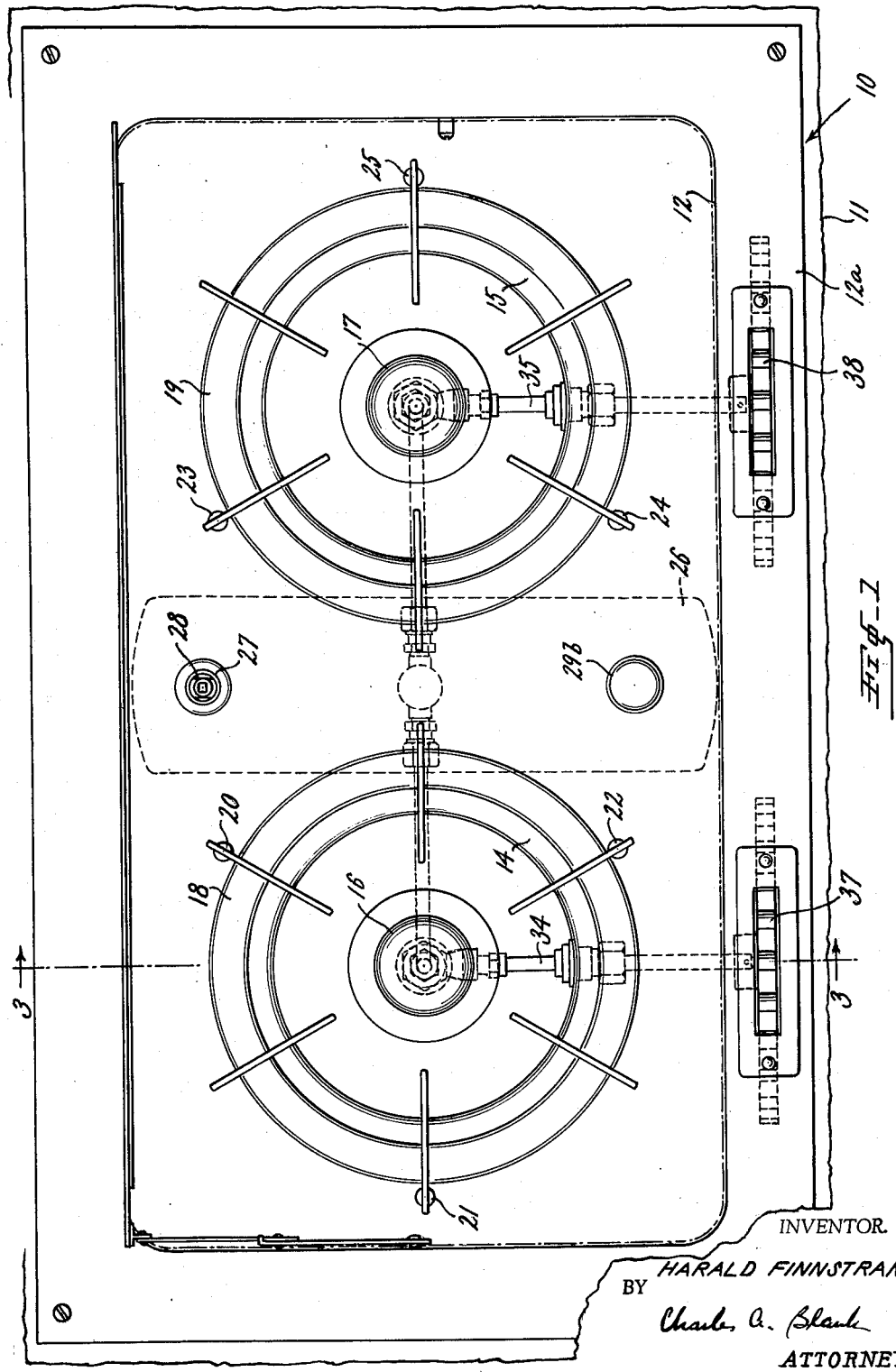
FIG. 1 is a plan view of a surface cooking unit constructed in accordance with the invention.

Referring now more particularly to FIGS. 1–4 of the drawings, a surface cooking unit 10 constructed in accordance with the invention is adapted to be mounted on a counter 11 with a body shell 12 disposed in an aperture of the counter. The body shell 12 has a lower wall 13 including at least one recessed burner-supporting portion 14 integral with the lower wall. The body shell 12 preferably includes two or more recessed burner-supporting wall portions 14, 15 integral with the lower wall. The lower wall of the body shell 12 preferably has a generally rectangular periphery and has front, rear and side walls with an outwardly extending mounting flange 12a adapted to support the shell on the supporting surface of counter 11 with the shell disposed in an aperture of the surface. The mounting flange 12a has a pair of apertures therein adjacent the front wall, as will be discussed subsequently. The body shell 12 may, for example, be of stainless steel construction.

A plurality of fuel burners 16, 17 are mounted, respectively, on the recessed portions 14, 15 within the shell. The recessed wall portions 14, 15 preferably are fitted within the lower wall 13 to form liquid-tight wells in the lower wall with the burners mounted thereon. The wells may, for example, be stainless steel members 1.7 inches deep and 5.3 inches in diameter. The lower wall 13 and the remainder of the body shell is also liquid-tight when the remaining units to be mentioned have been mounted thereon.

A plurality of utensil supports 18, 19 are mounted above the lower wall surrounding the burners 16, 17, respectively, for individually supporting utensils above the burners. More particularly, the utensil supports comprise grates mounted on studs 20, 21, 22 and 23, 24, 25 in liquid-tight connection to the lower wall. The utensil supports 18, 19 individually have lower surfaces spaced from the lower wall 13 of the body shell to allow combustion air to reach the burners between the utensil supports and the body shell. The upper surfaces of the grates may, for example, be spaced from the lower wall 13 by 1¼ inches. The utensil supports at their lower edges are spaced from the lower wall 13 by, for example, approximately ⅜ inch to allow combustion air to reach the burners between the lower edge of the utensil supports and the body shell.

The cooking unit also preferably includes a liquid fuel tank 26 communicating with the burners and mounted on the outside of the shell 12 and disposed under the shell between the wells 14, 15. The fuel tank could also be mounted in any other suitable position below the shell. The elongated generally cylindrical fuel tank 26 extends longitudinally toward the front and rear walls of the body shell and has a filler neck 27 extending through the body shell and capped by a suitable pressure relief valve 28. A suitable pump 29 to create pressure in the tank for forcing fuel to the burners is mounted in the tank and has a pumping handle 29b extending through the lower wall of the body shell. A suitably hinged lid 31 serves as a displaceable cover for enclosing the body shell to provide a surface substantially flush with the counter top.

Referring to FIGS. 1 and 3, the fuel burners 16, 17 have adjustable shafts 34, 35 extending toward the front wall under the lower wall 13. Each shaft controls a suitable needle valve in each burner, such as needle valve 36 of burner 16, controlling fuel flow to the burner. Control wheels are attached to the shafts through suitable extensions thereof. The bodies of the control wheels are under the mounting flange 12a and the peripheries of the control wheels partially extend through apertures of the mounting flange for finger adjustment of the shafts.

Considering now the operation of the surface cooking unit, the pump 29 may be manually operated to compress air by displacement of a suitable resilient valve 29a, causing liquid alcohol to flow to the burners. Manual adjustment of the control wheels 37, 38 adjusts the needle valves of the burners to control the alcohol flow to the burners. Combustion air for the burners enters from above the surface cooking unit and flows under the utensil support to air intake holes 40 of the burners. The flow of combustion air to the burners is more clearly represented in FIGS. 3 and 4 by the arrows.

The fuel vaporizes within the burner and mixes with air to supply a suitable fuel-air mixture for proper combustion. Exhaust fumes escape from the burner, by flowing between the utensil and the upper surface of the ring of the utensil support. The volume of the two wells 14, 15 preferably is approximately the same as the volume of the fuel tank so that any excess fuel supplied to a burner, for example, if the burner should be accidentally extinguished, will flow into the well and remain in the well. The front, rear and side walls of the body shell are effective to serve the function of guard rails to prevent the utensils from sliding off the cooking unit.

Figure 5:
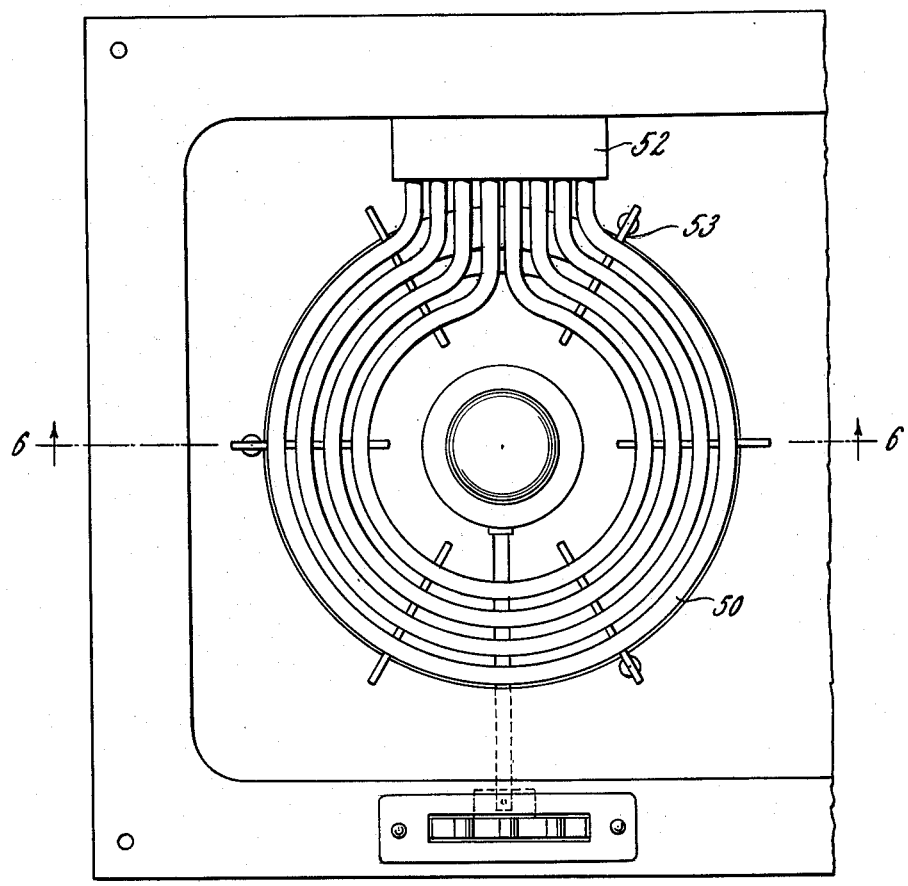
FIG. 5 is a fragmentary plan view of a cooking unit constructed in accordance with a modified form of the invention.
Figure 6:
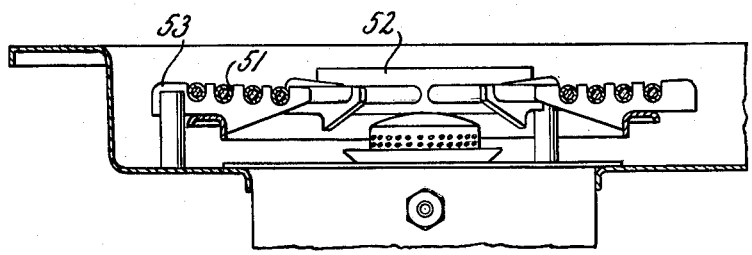
FIG. 6 is a fragmentary sectional view of the FIG. 5 unit, taken along line 6—6 of FIG. 5.

Referring now more particularly to FIGS. 5 and 6 of the drawings, there is represented a modified embodiment of the invention in which the surface cooking unit is adapted to heat utensils by fuel in accordance with the foregoing description or, alternatively, to heat utensils by means of electric heating units. To this end, an electric heating unit 50 of a type suitable for an electric stove is mounted on the utensil support. More particularly, the electric heating unit is mounted with coils extending along the periphery of the burner and positioned in recessed portions forming slots 51 of the utensil support 53. The electric unit 50 provides a substantially flush surface with the utensil support 53 in order to support and heat a utensil. A suitable electric insulating receptacle 52 serves as means for supplying electric current flow to he heating unit when attached to an external source of electric current. Accordingly, when a source of electric current is accessible to the marine galley, the electric heating unit may be utilized.

From the foregoing description, it will be apparent that a cooking unit in accordance with the invention has several advantages. The unit is particularly adapted for use in a marine galley as a surface cooking unit having a lid which encloses operative parts of the unit and provides a substantially flush counter surface. The unit has a liquid-tight body shell, and particularly, has liquid-tight recessed wells capable of containing fuel, thereby eliminating the need for a drip pan beneath the body shell. The unit nevertheless provides sufficient combustion air for the burners from above the unit.

The pump for the unit is in a vertical position inside the body shell and is concealed when the lid is closed. The burner knobs are substantially concealed under the mounting flange of the unit and are adapted for manual adjustment by finger. Thus, the unit can be installed in any location independent of the distance between the front wall of the unit and the front of the counter because the burner shafts and control wheels do not extend beyond the mounting flange of the unit. The unit may, of course, be installed in an angular position on a counter and it should be understood that the front wall of the unit does not necessarily refer to the wall of the unit closest to the counter front wall or operator.

A cooking unit in accordance with one form of the invention is also adapted for selective use as an electric stove and a fuel burning stove, which may be of the surface cooking type suitable for counter top installation.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A surface cooking unit for a marine galley comprising: a body shell have a lower wall including a plurality of recessed burner-supporting portions integral with said lower wall; a plurality of fuel burners individually mounted on said recessed portions within said shell; said recessed portions of said lower wall with said burners mounted thereon forming liquid-tight wells in said lower wall; a plurality of utensil-supporting grates having upper surfaces for individually supporting utensils above said burners; studs mounted in liquid-tight connection to said lower wall and supporting said grates with said upper surfaces above said burners and within said shell; said grates individually having lower surfaces spaced from said lower wall of said body shell to allow combustion air to reach said burners between said grates and said body shell; and a liquid fuel tank communicating with said burners and mounted on said shell and disposed outside said shell; the volume of said wells being approximately the same as the volume of said fuel tank.

2. A surface cooking unit for a marine galley comprising: a body shell having a lower wall with a generally rectangular periphery and having front, rear and side walls with an outwardly extending mounting flange adapted to support said shell on a supporting surface with said shell disposed in an aperture of the surface; a pair of recessed burner-supporting wells in said lower wall; a pair of fuel burners individually mounted in liquid-tight connection to said wells; a pair of utensil-supporting grates having upper surfaces for individually supporting utensils above said burners; studs mounted in liquid-tight connection to said bottom wall and supporting said grates with said upper surfaces above said burners and within said shell; said grates being spaced from said lower wall of said body shell to allow combustion air to reach said burners between said grates and said body shell; and a fuel tank communicating with said burners and mounted on said shell and disposed outside said shell.

3. A surface cooking unit in accordance with claim 2 in which said fuel tank is a liquid fuel tank communicating with said burners and mounted under said shell and disposed between said burners and having a filler neck extending through said shell; in which a pump is mounted in said tank and has a pumping handle extending through said lower wall of said shell; and which includes a displaceable cover for enclosing said shell.

4. A surface cooking unit in accordance with claim 2 in which said grates individually extend along the periphies of said burners and in which said grates have slots therein and in which electric heating units are individually mounted in said slots of said grates and extend along the peripheries of said burners.

5. A surface cooking unit for a marine galley comprising: a body shell having a lower wall with a generally rectangular periphery and having front, rear and side walls with an outwardly extending mounting flange adapted to support said shell on a supporting surface with said shell disposed in an aperture of the surface; said mounting flange having a plurality of apertures therein adjacent said front wall; a plurality of recessed burner-supporting wells in said lower wall; a plurality of fuel burners individually mounted in light-tight connection to said wells and individually having adjustable shafts extending through said wells toward said front wall under said lower wall; control members individually attached to said shafts and having their bodies under said flange and their peripheries individually extending through said apertures of said flange for manual adjustment of said shafts; a plurality of utensil-supporting grates having upper surfaces for individually supporting utensils above said burners; studs mounted in liquid-tight connection to said lower wall and supporting said grates with said upper surfaces above said burners and within said shell; said grates individually having lower surfaces spaced from said lower wall of said body shell to allow combustion air to reach said burners between said grates and said body shell; and a fuel tank communicating with said burners and mounted on said shell and disposed outside said shell.

References Cited by the Examiner

UNITED STATES PATENTS

| | | | |
|---|---|---|---|
| 1,559,337 | 10/1925 | McFarlane | 219—37 |
| 1,716,329 | 6/1929 | Simpson | 219—37 |
| 1,862,452 | 6/1932 | Arndt | 126—37 |
| 2,087,720 | 7/1937 | Guenther et al. | 126—214 X |
| 3,007,465 | 11/1961 | Kamin | 126—214 X |

FOREIGN PATENTS

| | | |
|---|---|---|
| 502,197 | 5/1954 | Canada. |
| 59,811 | 9/1938 | Norway. |

OTHER REFERENCES

German printed application No. 1,127,061, printed Apr. 5, 1962.

FREDERICK L. MATTESON, JR., *Primary Examiner.*

RICHARD M. WOOD, JAMES W. WESTHAVER, *Examiners.*

UNITED STATES PATENT OFFICE
CERTIFICATE OF CORRECTION

Patent No. 3,230,947                                                  January 25, 1966

Harald Finnstrand

It is hereby certified that error appears in the above numbered patent requiring correction and that the said Letters Patent should read as corrected below.

Column 3, line 39, for "he" read -- the --; column 4, line 6, for "have" read -- having --; lines 52 and 53, for "periphies" read -- peripheries --; line 66, for "light-tight" read -- liquid-tight --.

Signed and sealed this 7th day of February 1967.

(SEAL)
Attest:

ERNEST W. SWIDER
Attesting Officer

EDWARD J. BRENNER
Commissioner of Patents